United States Patent [19]
Fesmire et al.

[11] Patent Number: 6,067,483
[45] Date of Patent: *May 23, 2000

[54] ELECTRICAL DISTRIBUTION COMPUTER

[75] Inventors: James T. Fesmire; James A. Ford; William R. Goldbach; Allen J. Bradley, all of Greensboro, N.C.

[73] Assignee: Power Integrity Corporation, Greensboro, N.C.

[*] Notice: This patent issued on a continued prosecution application filed under 37 CFR 1.53(d), and is subject to the twenty year patent term provisions of 35 U.S.C. 154(a)(2).

[21] Appl. No.: 08/976,840

[22] Filed: Nov. 24, 1997

Related U.S. Application Data

[63] Continuation of application No. 08/540,177, Oct. 6, 1995, abandoned.

[51] Int. Cl.$^7$ .................................................. G06F 19/00
[52] U.S. Cl. ........................... 700/296; 700/276; 700/306
[58] Field of Search ........................ 364/528.21, 528.27, 364/528.3; 307/11, 31, 38–41, 327, 326, 116–117, 125–126, 141, 141.4; 361/1, 3, 83, 103, 115, 118, 160, 170, 173, 191, 195; 340/825.06; 700/276, 296, 306

[56] References Cited

U.S. PATENT DOCUMENTS

| | | | |
|---|---|---|---|
| 4,131,776 | 12/1978 | Ehrenberger | 200/158 |
| 4,623,859 | 11/1986 | Erickson et al. | 335/14 |
| 4,656,475 | 4/1987 | Miller et al. | 340/825.06 |
| 4,719,532 | 1/1988 | Schneider | 361/189 |
| 4,814,929 | 3/1989 | Ashley | 361/1 |
| 4,920,476 | 4/1990 | Brodsky et al. | 364/140 |
| 4,964,058 | 10/1990 | Brown, Jr. | 364/492 |
| 4,996,646 | 2/1991 | Farrington | 364/483 |
| 5,083,103 | 1/1992 | Winter et al. | 335/14 |
| 5,086,385 | 2/1992 | Launey et al. | 364/188 |
| 5,180,051 | 1/1993 | Cook et al. | 200/400 |
| 5,249,115 | 9/1993 | Reid | 364/492 |
| 5,323,307 | 6/1994 | Wolf et al. | 364/492 X |

*Primary Examiner*—Melanie A. Kemper
*Attorney, Agent, or Firm*—Rhodes & Mason, PLLC

[57] ABSTRACT

An electrical distribution computer panel for delivering and controlling power to a plurality of electrical circuits. The electrical distribution computer includes a unitary enclosure having a top, bottom, sides and a door. Located within the enclosure is a microprocessor having a central processing unit, a clock for providing a clock signal to the central processing unit, memory for storing an application program for the central processing unit and a remote communication circuit for providing communications to the electrical distribution computer from a remote device. Also located in the enclosure is an interface having a plurality of outputs and a plurality of inputs communicably associated with the microprocessor and a plurality of computer controllable circuit breakers having a circuit breaker input for receiving a circuit breaker control signal from the interface. A display for displaying information provided by the microprocessor is located on an outer wall of the enclosure. The display includes a display input for receiving a display signal from the interface. A keypad including an output for providing information to the interface is also located on an outer wall of the enclosure.

34 Claims, 3 Drawing Sheets

ELECTRICAL DISTRIBUTION COMPUTER

This application is a continuation of application Ser. No. 08/540,177, filed Oct. 6, 1995, now abandoned.

BACKGROUND OF THE INVENTION (1). Field of the Invention

The present invention relates generally to electrical panels having a series of circuit breakers and, more particularly, to an electrical distribution computer for controlling the operation of its circuit breakers in response to a pre-programmed energy conservation schedule.

(2). Description of the Prior Art

Energy conservation remains important today. Particularly in medium to large convenience and general retail stores, such as WalMart, significant energy savings can be obtained by reliably controlling heating, cooling and lighting according to an energy conservative schedule which does not inconvenience the customer.

U.S. Pat. No. 5,323,307, issued to Brooks et al., discloses an automation and energy management system which includes an automation panel box which may be positioned adjacent to a circuit breaker panel box. The automation panel box includes one or more circuit breaker control modules,one or more device control modules and a power module for providing power to the control modules. The circuit breaker control module provides signals to operate motorized circuit breakers, so as to turn on or off the power to a device being managed and the device control module provides signals to control individual appliances. Each of the two control modules is capable of controlling up to eight different circuit breakers or eight different individual devices and each includes a manual override button for each breaker or device controlled, which override button can be manually pressed by a person desiring to override the automation and energy management control. Each control module includes a counting circuit which sequentially enables one of several toggle circuits that sustains the state of each circuit breaker (or appliance switch). A facility computer generally communicates with the modules over a bus and issues commands to cause certain automatic functions of energy management to occur.

U.S. Pat. No. 5,180,051, issued to Bilas et al., discloses a remotely controllable circuit breaker device for interrupting power in a circuit path between a source and a load which includes local and remote monitoring capabilities and a worm-gear mechanism for reliable control of the interruption mechanism. The device includes a first contact and a second contact cooperatively arranged in the circuit path so as to provide current from the source to the load. At least one of the contacts are movable for interrupting the power provided to the load. The worm gear mechanism includes a motor with a rotatable shaft which responds to open and closed control signals generated from a remote location, and a gear,rotatably responsive to the rotatable shaft, for controlling the movable contact so that the circuit path is interrupted and established, respectively. The worm gear mechanism controls the movable contact using a coupling arrangement, which has a first part coupled to the movable contact and a second part coupled to the gear.

U.S. Pat. No. 4,996,646, issued to Farrington, discloses a circuit breaker system which uses a microprocessor for calculating at least one function of a measured current flow. The microprocessor provides other functions such as serial data stream communications, the ability of many circuit breaker systems to communicate with a central computer, storage of trip information concerning the last trip, storage of historical trip information concerning a number of past trips, EEPROM memory for storing trip information. The microprocessor may inhibit tripping on a high current fault to permit storage of trip information into a memory. Power is derived from current transformers drawing energy from current flow to a load and the electronics are protected from high voltage caused by heavy current flow to the load. Optical isolators are used for the circuit breaker to communicate with external equipment. A multi-turn resistor adjusts an external test voltage for testing the circuit breaker system. In the event that there is no load or a load drawing insufficient current to provide power for the electronics the circuit breaker may be externally powered to provide readout of electrically erasable programmable read only memory. The microprocessor reads setting switches and a multiplier plug. Also the microprocessor is capable of digitizing selected quantities frequently and of digitizing other quantities less frequently. A second microprocessor permits one microprocessor to sampler voltage and current rapidly for metering purposes, and the second microprocessor operates other functions.

U.S. Pat. No. 4,964,058, issued to Brown, discloses an automation and energy management system which includes an automation panel box which may be positioned adjacent to a circuit breaker panel box. The automation panel box includes one or more circuit breaker control modules, one or more device control modules and a power module for providing power to the control modules. The circuit breaker control module provides signals to operate motorized circuit breakers, so as to turn on or off the power to a device being managed and the device control module provides signals to control individual appliances. Each of the two control modules is capable of controlling up to eight different circuit breakers or eight different individual devices and each includes a manual override button for each breaker or device controlled, which override button can be manually pressed by a person desiring to override the automation and energy management control. In addition, each of the modules includes status terminals for receiving status signals from the devices being controlled to indicate whether control is to occur or to be overridden. A facility computer generally communicates with the modules over a bus and issues commands to cause certain automatic functions or energy management to occur. The signals on the status lines can override the facility computer signals and the actuation of one of the reset buttons can override either the status signals or the facility controller.

U.S. Pat. No. 4,623,859, issued to Erickson et al., discloses an electric circuit breaker capable of being opened and closed from a remote location. The circuit breaker includes a stationary contact, amovable contact mounted on a carrier and a trip mechanism that trips the circuit breaker, moving the carrier to an open position upon the occurrence of an overcurrent. The remote control assembly opens and closes the circuit breaker independently of the trip mechanism. Upon receiving a signal from a timer switch, a motor operates, rotating a gear spring connected to the motor shaft. An actuator has a tooth positioned between the wire layers of the gear spring. As the gear spring rotates, the tooth moves toward the motor, pivoting the actuator. An operating rod, connected to both the actuator and the carrier, pulls the carrier to open the contacts as the actuator rotates. When the contacts reach the open position, the actuator hits a switch to shut off the motor.

U.S. Pat. No. 4,131,776, issued to Ehrenberger, discloses a motorized drive assembly for a circuit breaker operator which includes a follower mounted on a free wheeling double helix shaft which extends in the direction of movement of the operator between "TRIP," "RESET" and "ON" positions, the shaft being driven by an electric motor through a disengageable gearset controlled by a solenoid. The follower engages the operator, and upon rotation of the shaft the follower moves in one direction carrying the operator from a TRIP position to a RESET position. At this point, the follower has moved as far as one of the double helices will carry it in that direction, whereupon internally projecting lugs of the follower engage the other helix for movement in the opposite direction to carry the operator from the RESET to the ON position in which the breaker contacts are closed. The solenoid is then de-energized whereupon the gearset disengages, and the double helix shaft becomes freewheeling which allows the follower to move freely when the circuit breaker trips causing the operator to move from the ON position to the TRIP position.

In addition to the advent of motorized circuit breakers, such as discussed above, there are now available single-board-computers which include a CPU, RAM, display and keyboard connectors, and serial and parallel outputs. These computers, heretofore, were too large to be directly connected to motorized circuit breakers in a single, unitary electrical distribution panel.

Thus, there remains a need for a new and improved electrical distribution computer panel having a plurality of motorized circuit breakers and an imbedded computer control system for selectively controlling each of the motorized circuit breakers in response to a pre-programmed energy conservation schedule.

SUMMARY OF THE INVENTION

The present invention is directed to an electrical distribution computer panel for delivering and controlling power to a plurality of electrical circuits. The electrical distribution computer includes a unitary enclosure having a top, bottom, sides and a door. Located within the enclosure is a microprocessor having a central processing unit, a clock for providing a clock signal to the central processing unit, memory for storing an application program for the central processing unit and a remote communication circuit for providing communications to the electrical distribution computer from a remote device.

Also located in the enclosure is an interface having a plurality of outputs and a plurality of inputs communicably associated with the microprocessor and a plurality of computer controllable circuit breakers having a circuit breaker input for receiving a circuit breaker control signal from the interface and output for indicating its status.

A display for displaying information provided by the microprocessor is located on an outer wall of the enclosure. The display includes a display input for receiving a display signal from the interface. A keypad including an output for providing information to the interface is also located on an outer wall of the enclosure.

Once the microprocessor is programmed and the breakers and relays are connected to a power source, the enclosure may be locked and secured from tampering. However, the entire electrical distribution computer may be operated from the display and keypad mounted on an outer wall of the enclosure.

Accordingly, one aspect of the present invention is to provide an electrical distribution computer for delivering and controlling power to a plurality of electrical circuits. The electrical distribution computer includes: (a) a unitary enclosure; (b) a processor means having a central processing unit, a clock for providing a clock signal to the central processing unit, and memory for storing an application program for the central processing unit; (c) an interface having a plurality of outputs and a plurality of inputs communicably associated with the processor means; and (d) a plurality of computer controllable circuit breakers having a circuit breaker input for receiving a circuit breaker control signal from the interface.

Another aspect of the present invention is to provide an embedded computer for an electrical distribution computer for delivering and controlling power to a plurality of electrical circuits. The computer includes: (a) a processor means having a central processing unit, a clock for providing a clock signal to the central processing unit, and memory for storing an application program for the central processing unit; (b) an interface having a plurality of outputs and a plurality of inputs communicably associated with the processor means; and (c) a remote communication means for providing communications to the electrical distribution computer from a remote device.

Still another aspect of the present invention is to provide an electrical distribution computer for delivering and controlling power to a plurality of electrical circuits. The electrical distribution computer includes: (a) a unitary enclosure; (b) a processor means having a central processing unit, a clock for providing a clock signal to the central processing unit, memory for storing an application program for the central processing unit and a remote communication means for providing communications to the electrical distribution computer from a remote device; (c) an interface having a plurality of outputs and a plurality of inputs communicably associated with the processor means; (d) a plurality of computer controllable circuit breakers having a circuit breaker input for receiving a circuit breaker control signal from the interface; and (e) a display for displaying information provided by the processor means, the display having a display input for receiving a display signal from the interface, and a keypad having an output for providing information to the interface.

These and other aspects of the present invention will become apparent to those skilled in the art after a reading of the following description of the preferred embodiment when considered with the drawings.

DESCRIPTION OF THE PREFERRED EMBODIMENTS

Figure 1:
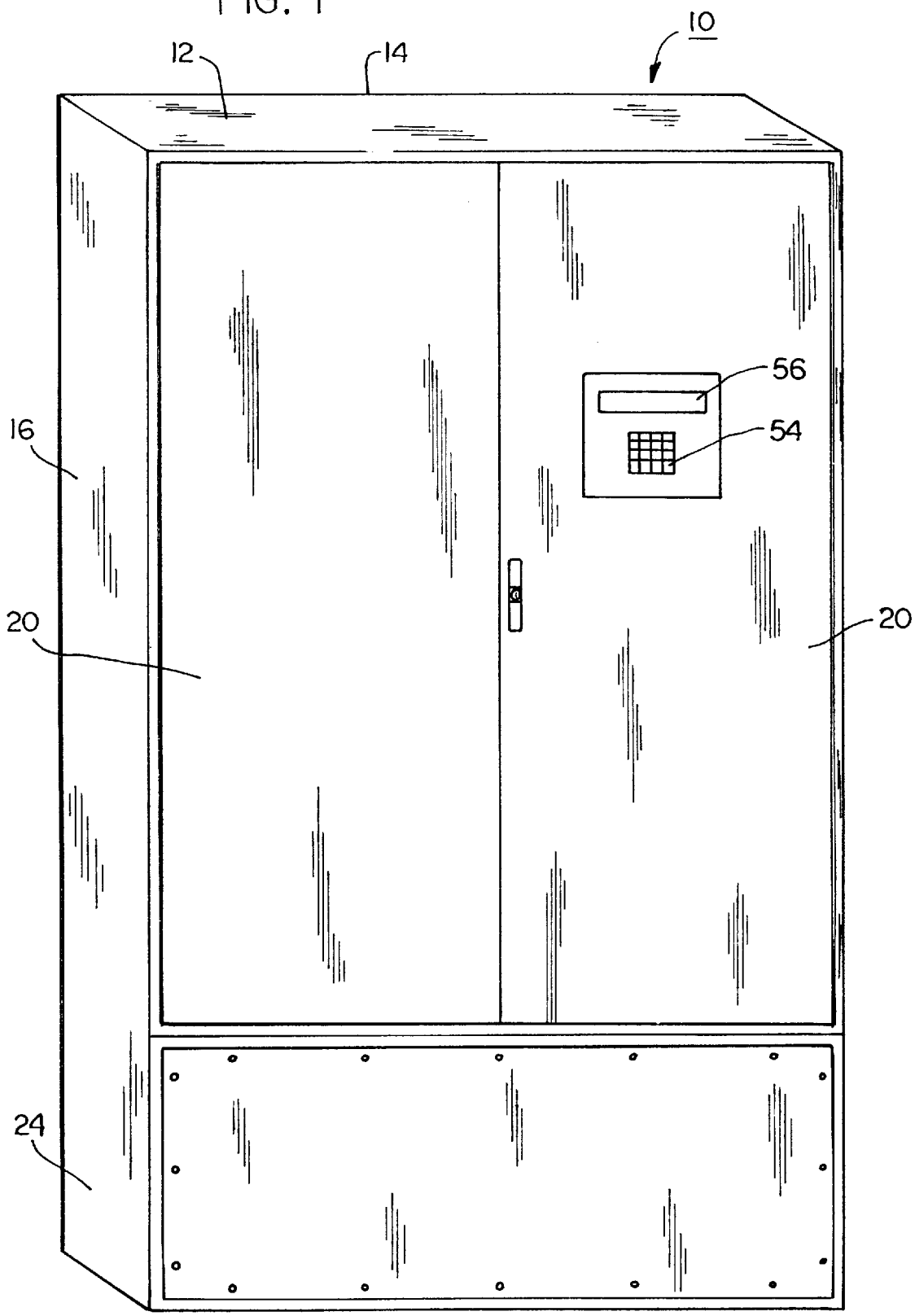
FIG. 1 is a depiction of the outside of an electrical distribution computer constructed according to the present invention.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. As best seen in FIG. 1, an electrical panel control system, generally designated 10, is shown constructed according to the present invention. As best seen in FIG. 1, an exterior depiction of the electrical distribution computer (EDC), generally designated 10, is shown constructed according to the present invention. The EDC 10 generally includes a top 12, a back 14, sides 16, doors 20, a pedestal 24, a keypad 54, and a display 56.

Figure 2:
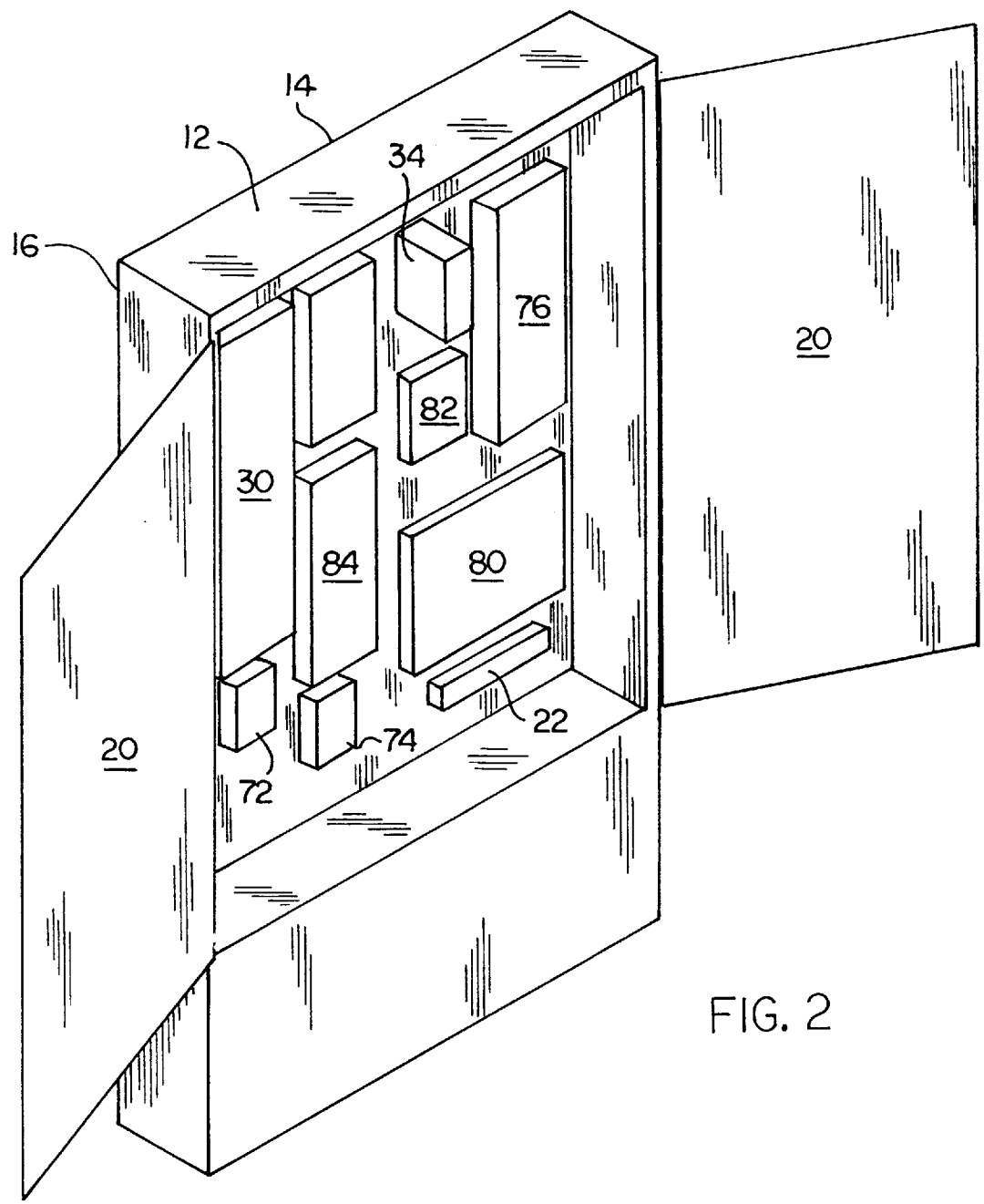
FIG. 2 depicts the electrical distribution system and a modular diagram of major internal components of the present invention.

Turning now to FIG. 2, there is shown a modular depiction of the major internal components of the EDC 10. The EDC 10 includes computer control circuit breakers 30. A detailed description of computer-controlled circuit breakers is hereby incorporated by reference in its entirety to U.S. Pat. No. 4,623,859 to Ericson et al. issued on Nov. 18, 1986. The circuit breakers 30 provide advance control and state-of-the-art monitoring of specified circuits eliminating the need for expensive contactors that have to be routinely serviced. Various relays 76 are provided for controlling switching to various circuits. For example, the relays 76 could be used for pump control, thereby eliminating the need for external pump relays, or dispenser isolation/emergency cutoff control, thereby maintaining total electrical isolation between a dispenser's handle switches while providing total electrical disconnection of class I circuits as required by the National Electrical Code. Pump/dispenser service disconnect switches 82 allow service technicians to isolate a dispenser or pump so that it can be serviced without interrupting the operation of other pumps or dispensers. The main service connection is made through the main lugs 74. Typically, a main feeder surge suppressor 72 is installed at the power input of the panel. This provides protection against damage to electrical equipment due to incoming power surges. All feeders for the panel boards 84 are wired to the main lugs 74 through the surge suppressors 72.

In a similar fashion, branch circuit surge suppressors 80 protect sensitive electronic circuits in which power is being distributed. Field wiring terminals 22 allow quick and easy connections to external circuits.

At the heart of the EDC 10 is a processor 34. The processor 34 provides for advanced computer control of lighting loads, circuit breakers, HVAC systems and more to allow for efficient power distribution and control.

Figure 3:
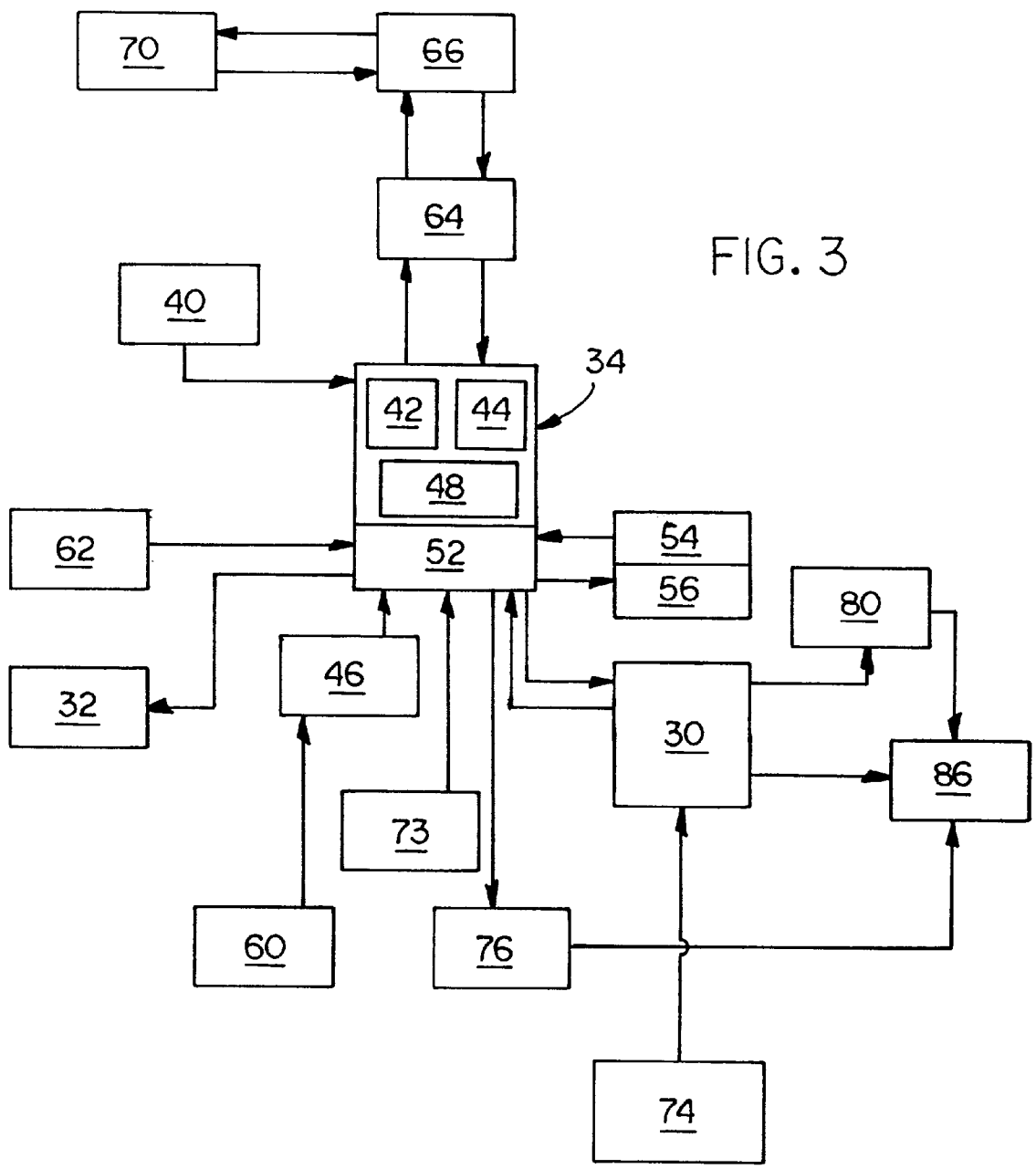
FIG. 3 is a block diagram illustrating the functions of the electrical distribution computer of the present invention.

Now turning to FIG. 3, the processor 34 is shown in relation to the various components of the EDC 10. In a typical configuration, the processor 34 will either contain or utilize a clock 40, a central processing unit (CPU) 36, an I/O interface 52, and memory, which generally comprises read-only memory (ROM) 42 and random access memory (RAM) 44. The CPU 36 is generally clocked by the clock 40 and runs an application program stored in memory. The program is permanently stored in ROM 42, but is typically copied into RAM 44 to allow for quicker application program access. The I/O interface 52 allows the CPU to receive inputs from an analog-to-digital converter (ADC) 46, a keypad 54, and various other alarms such as a security alarm 73. The ADC 46 converts analog signals received from environmental sensors 60 into a digital signal for the processor 34. The environmental sensors may include light detection sensors, temperature sensors, etc. A remote operator alarm 62 may also be received to allow an operator of the system to inform the processor 34 of a predetermined alarm condition. The alarm condition may be something as simple as informing the processor 34 that the store should not be shut down for another 15 minutes. The interface 52 allows the processor 34 to control various output devices including the relays 76, the circuit breakers 30, and a display 56. The relays 76 allow the computer to control power to various circuits outside the electrical distribution system. The circuit breakers 30 provide circuit protection for controlled circuits 86 such as an HVAC system 32 and maintain the ability to be reset by the computer in accordance with the application program and any other data received by the system.

Another aspect of the preferred embodiment includes a communications port 64, which may include a modem 66, allowing remote access 70 from a source other than the keypad 54 or the remote operator override 62. Those of ordinary skill in the art will recognize various communicational alternatives, such as RS232 serial communications.

Typically, the EDC facilitates total power distribution control throughout the store or business. The computer monitors various environmental signals, such as temperature and light, to facilitate efficient environmental control using relays to control everything from the lights and heating and air-conditioning to the gasoline pumps and dispensers. In addition, the various surge protectors and circuit breakers protect electronics within various circuits while allowing the computer to reset the breakers at an appropriate time and order. The security and remote operator inputs provide simple controls for an operator to signal the computer of an occurrence or emergency situation. Furthermore, the keypad and display along with the remote access ability allow an operator to modify the application program, alter environmental settings or receive any necessary system information.

In general, the EDC controls various relays and circuit breakers while monitoring the circuits via the circuit breakers and the environment via the environmental sensors.

Controller Overview

The control system consists of an embedded controller, LCD, keypad, and serial interface for the motorized circuit breakers all located in one integral panel box. In the preferred embodiment, the embedded controller is a WinSystems Inc. SAT-V40 single board computer. It uses a V40 CPU at 10 MHz, a battery powered clock and calendar, a built-in A/D converter, three RS-232 serial ports, one parallel printer port, one general purpose 24 bit parallel port and an industry standard PC-104 expansion port. It utilizes ROM-DOS by Datalight as the operating system. This operating system is similar to MS-DOS. It uses an EPROM to emulate disk drive "A:". Iuses battery backed RAM to emulate disk drive "B:".

Therefore programs can be written to run on this product which will also run on a PC.

Drive A: contains the operating system, the executable program and the default tables. These tables provide the start-up information for the passwords, circuit descriptions, and schedules.

Drive B: contains the user tables and log files. The user can edit the default tables and save the changes in the user tables. The run-time totals for each motorized breaker are stored in a separate log file for each month of the year. Therefore, totals for the past year are stored for review at any given time. A transaction log records specific events for diagnostic purposes.

The controller provides two operator interfaces; a local interface using the LCD and keypad on the front door, and a remote interface using a serial port.

When the program first starts, it tries to read the user password file from B: (B:\USER.PWD). If not found, it reads the default password file from A:

(A:\DEFAULT.PWD). It then tries to read the user configuration file from B: (B\:USER.CFG). If not found, it reads the default configuration file from A: (A:\DEFAULT.CFG). It then reads the circuit run time totals from the log file for the previous month and the log file for the current month. (B:\JAN.LOG, B:\FEB.LOG, etc.)

The program goes through the initial start-up procedure as described and then goes into an endless loop. Each execution of the loop is called a scan. Each scan takes less than a second to perform the following tasks.

The watchdog timer is strobed. If the watchdog is not strobed within 1.5 seconds, it will force a system reset. This prevents the system from getting "hung up" where nothing appears to work.

The scan LED on the processor board is toggled. If it is off, it is turned on. If it is on, it is turned off.

The current time is read from the system clock. The clock is powered by the battery when AC power is not available. It continues to keep time even when the SAT-V40 is off.

The transaction log (TRANSACT.LOG) is checked for length. If it is over 600 lines, the first 100 lines are deleted.

The text string containing the time and date for display is updated.

The main control loop is executed. This is a finite state machine which uses input from the local keypad and the remote terminal via the serial port to change states.

The remote control loop is executed. This is another finite state machine which uses input from the remote terminal via the serial port to change states.

The current data in the display buffer is displayed on the LCD. This buffer is controlled by the finite state machine described above.

A command string is formatted and sent to the Square D PowerLink AS interface module which controls the individual breakers. Three scans later, a query string is sent, and the reply is decoded. The status of each breaker is maintained in an array in memory. Communication with the PowerLink AS is asynchronous. Therefore, the program timing has to accommodate some variation.

The run time totals for each circuit are updated every minute. The total log file for the current month is updated every 15 minutes.

The keypad buffer is checked for characters. If it contains one or more characters, the first one is read. Otherwise the serial port buffer for the remote terminal is checked for characters. If it contains one or more characters, the first one is read. These remote characters are fed to the finite state machines as user commands.

This completes a scan and it starts over again at the top of the loop by strobing the watchdog timer.

Schedule Concepts

All scheduling is done relative to the store hours. This is done to make it easy to change the hours of operation. Each automatic circuit is scheduled by the store hours instead of the time of day. If the hours change, it is only necessary to change one schedule, not 36 circuits.

The store hours are edited for each day of the week using the Edit Store Hours menu. The Edit Delays menu is used to edit the Set-up, Close, and Clean-up delays. These delays are the same for each day of the week. The Set-up Delay is the time allowed for the first employee to arrive and prepare to open the store for business. The Close Delay is the time allowed for the last customers to finish transacting business. The Clean-up Delay is the time allowed for the last employee to finish cleaning up and to leave.

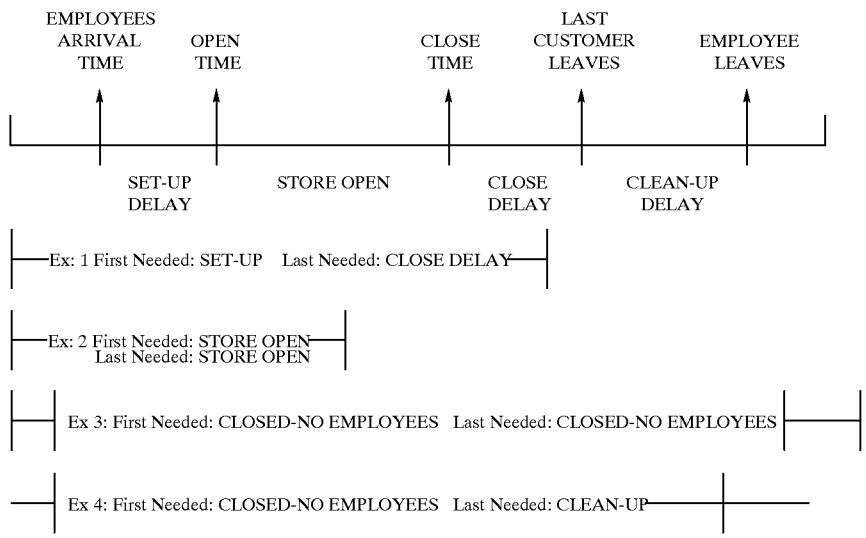

The analog inputs are evaluated: The outside light level is measured. The temperatures in both zones are measured.

The current period of the day is calculated by comparing the current time and day of week with the store schedule. This is done only once each minute and after each key stroke. The period and the outside light level are then compared to the schedule of each circuit to determine which circuits are required to be on.

The schedules for each of the 36 circuits are edited using the Edit Circuit Schedule menu. You will be prompted for the first and last periods of the day that the circuit is needed.

Example 1 above shows a circuit schedule which is needed from the time the first employee is scheduled to arrive until the last customer leaves. Therefore, the first period is "SET UP" and the last period is "CLOSE DELAY". "CLOSE DELAY" is called "LAST CUSTOMER DELAY" on the Edit Circuit Schedule menu.

Example 2 above shows a circuit schedule which is needed only during scheduled store hours. Therefore the first and last periods are both "STORE OPEN".

Example 3 above shows a circuit schedule which is needed only when no employees are scheduled to be present. This is indicated by setting both first and last periods to "CLOSED-NO EMPLOYEES".

Example 4 above shows a circuit schedule which is needed 24 hours. The first period needed is "CLOSED-NO EMPLOYEES" which covers both ends of the time line in the example. The last period is "CLEAN UP".

Local User Interface

Title:

| | |
|---|---|
| YOUR COMPANY NAME<br>POWER INTEGRITY<br>v0.10<br>03:35PM MON OCT 31, 1994 5:SUN | The title screen is displayed when the controller is first powered up. The company names are easily changed as well as the version number. The current time, date, and outside light level are displayed. Press <ENTER> to switch to the next screen. |

Main Menu:

| | |
|---|---|
| 03:35PM MON OCT 31, 1994 5:SUN<br>0 - HELP      3 - SET SCHEDULE<br>1 - CIRCUITS  4 - HEAT/COOL<br>2 - SET TIME  5 - PASSWORD<br>  & DATE      PRESS:<br>          0–5 | The Main Menu provides access to the major user functions. Press <CLEAR> to return to the first screen. Press <0> at any menu to call up a context sensitive HELP screen which explains how to use the current menu. Press <0> at this screen to bring up a HELP screen which explains how to use HELP. |

Help:

| | |
|---|---|
| WELCOME . . . HELP IS AVAILABLE ALMOST ANY TIME BY PRESSING <0>.<br>PRESS <↓> TO SCROLL DOWN WHEN THE LAST LINE ENDS WITH A DOWN ARROW LIKE THIS. ↓ | The <↑> up and <↓> down arrow keys allow the screen to scroll when more than four lines of help text are available. Press <CLEAR> to return to the exact screen from where HELP was called. |

Circuit Summary:

| | |
|---|---|
| <1*> 5_ 9* 13* 17* 21* 25* 29* 33*<br>2* 6_ 10T 14* 18* 22* 26* 30* 34*<br>3* 7* 11* 15* 19* 23* 27* 31* 35*<br>4* 8* 12* 16* 20* 24* 28* 32* 36* | Press <1> at the Main Menu to call up this circuit summary. The current status of each motorized breaker is displayed. * indicates the output of the breaker is energized. _ indicates the breaker is off. T indicates that the breaker is commanded to be on but the output is not energized. Select a circuit by using the arrow keys to move tha < > angle brackets to mark the required number. Then press <ENTER> to call the Circuit Menu. |
| 1* 5_ 9* 13* 17* 21* 25* 29* 33*<br>2* 6_ 10T 14* 18* 22* 26* 30* 34*<br>3* 7* 11* <15*> 19* 23* 27* 31* 35*<br>4* 8* 12* 16* 20* 24* 28* 32* 36* | |

Circuit Menu:

| | |
|---|---|
| CRKT 15: SIGNS    CMD: ON<br>SEP: 242.3 HRS OCT: 234.1<br>HRS STATUS: ON<br>1 - SCHEDULE<br>2 - LEVEL<br>3 - OVERRIDE<br>0 - HELP | CRKT15: SIGNS indicates the number and name of the selected circuit. CMD: ON indicates that the breaker is commanded to be on by the controller. STATUS: ON indicates that the circuit is energized. SEP: 242.3 indicates the total number of hours that this circuit was energized last month. OCT: 234.1 indicates the total number of hours that this circuit was energized to date this month. |

Edit Circuit Schedule:

| | |
|---|---|
| FIRST NEEDED: ←[15]<br>LAST NEEDED: STORE OPEN<br>:STORE OPEN<br>STORE OPEN FOR BUSINESS<br>PRESS ←→ CHANGE<br>FIELDS, ↑↓ CHANGE TIME | From the Circuit Menu, press <1> to edit an individual circuit schedule. Access is password restricted. The symbol ←[15] indicates that the first period of the day that circuit 15 is needed is displayed. Press <↑> up or <↓> to change periods. The choices are: |

CLOSED-NO EMPLOYEES: The circuit is requried all hours that the store is closed.
SET UP: The circuit comes on in time for the first employees to arrive. This provides time to get ready to open the store. An outside light can provide a measure of security for employees who would otherwise arrive in the dark.
STORE OPEN: The circuit comes on at the scheduled store open time.
LAST CUSTOMER DELAY: The circuit come on at the scheduled store closing time. A delay is provided for the last customers to finish and leave.
CLEAN UP: The circuit comes on after the last customer delay to provide clean up time.

| | |
|---|---|
| FIRST NEEDED: [15]→<br>LAST NEEDED: STORE OPEN<br>:STORE OPEN<br>STORE OPEN FOR BUSINESS<br>PRESS ←→ CHANGE<br>FIELDS, ↑↓ CHANGE TIME | Press <→> right to edit the last period of the day that the current circuit is needed. The symbol [15]→ indicates that the last period of the day that circuit 15 is needed is displayed. It is up to the user to be sure that the last period of the day is the same, or later than the first period. The choices are the same: |

CLOSED-NO EMPLOYEES: The circuit is required all hours that the store is closed, but is not needed for set up during store hours. (The First Period must also be: CLOSED-NO EMPLOYEES.)
SET UP: The circuit goes off after the set up time. It is not needed during store hours.
STORE OPEN: The circuit goes off at the scheduled store closing time.
LAST CUSTOMER DELAY: The circuit goes off after a delay which is provided for the last customers to finish and leave.
CLEAN UP: The circuit goes off after another delay to provide clean up time.
Note for 24 Hours: For 24 hour service, the First Period is: CLOSED-NO EMPLOYEES and the Last Period is: CLEAN UP.

| | |
|---|---|
| CRKT 15: SIGNS<br>CMD: ON<br>SEP:242.3 HRS<br>OCT:234.1 HRS<br>STATUS: ON<br>1 - SCHEDULE<br>2 - LEVEL<br>3 - OVERRIDE<br>0 - HELP | Press <ENTER> when both the first and last periods are set as required to return to the Circuit Menu screen. Press <ENTER> again to return to the Circuit Summary screen, or press <2> to edit the individual circuit light level. |

Edit Circuit Level:

| | |
|---|---|
| CRKT 15: SIGNS<br>3:MEDIUM<br>SELECT THE MAXIMUM<br>OUTSIDE LIGHT LEVEL<br>FOR THIS CIRCUIT TO BE ON.<br>PRESS ↑↓ TO CHANGE | Access is password restricted. Press the <↑> up or <↓> down keys to change the value. The choices are 0:DARK through 5:SUN. Select the maximum light level in which the particular circuit is required. 5:SUN means that the circuit is on whenever scheduled |

-continued

Local User Interface

| | |
|---|---|
| CRKT 15: SIGNS<br>CMD: ON<br>SEP:242.3 HRS<br>OCT:234.1 HRS<br>STATUS: ON<br>1 - SCHEDULE<br>2 - LEVEL<br>3 - OVERRIDE<br>0 - HELP<br>Circuit Override: | regardless of the light level.<br>0:DARK means that the circuit<br>is only on when it is very dark.<br>Press <ENTER> to return to the<br>Circuit Menu screen. Press <3 ><br>to override a circuit. |
| CRKT 15: SIGNS<br>CMD: ON<br>PRESS <1> TO OVERRIDE ON<br>PRESS <2> TO OVERRIDE OFF<br>PRESS <3> TO CLEAR OVERRIDE<br>0 - HELP | Access is password restricted<br>Overrides are temporary. An<br>override will only be in force<br>until the next scheduled change<br>for that circuit. The symbol<br>CMD: ON indicates the breaker<br>is commanded to be on by the<br>controller. Press <2> to override<br>the circuit and turn it off.<br>Overrides which match<br>the controller command<br>have no effect. |
| CRKT 15: SIGNS<br>OVRD: OFF<br>PRESS <1> TO OVERRIDE ON<br>PRESS <2> TO OVERRIDE OFF<br>PRESS <3> TO CLEAR OVERRIDE<br>0 - HELP | The symbol CMD: ON changes<br>to OVRD: OFF which indicates<br>that the circuit command has<br>been overridden to off. The<br>override will remain in effect<br>until the schedule matches the<br>override state. Press <3> to<br>clear the override and return the<br>circuit to normal control. |
| Set Time & Date: | |
| SET TIME:   NOV 3, 1994<br>8:56 AM<br>↑<br>PRESS ←→ CHANGE FIELD,<br>↑↓ CHANGE HOUR<br>PRESS <ENTER> TO ACCEPT,<br><CLEAR> CANCELS<br>SET TIME:   NOV 3, 1994<br>       ↑<br>PRESS ←→ CHANGE FIELD,<br>↑↓ CHANGE MONTH<br>PRESS <ENTER> TO ACCEPT,<br><CLEAR> CANCELS | Press <2> at the Main<br>Menu to set the time and date.<br>Access is password restricted.<br>The <←> left and <→><br>right arrows change fields and<br>the <↑> up and <↓> down<br>arrows change values. A pointer<br>below the time date line points<br>to the current field and the<br>field is named on the next line.<br>Change the value of each field to<br>the correct time and date and<br>press <ENTER>. <CLEAR><br>will return to the Main Menu<br>without changing the time. The<br>controller knows the number of<br>days in each month, including<br>leap year, and will not allow<br>invalid dates. |
| Set Schedule Menu: | |
| 03:35 PM MON OCT 31, 1994 5:SUN<br>PERIOD:2-OPEN<br>EXTRA TIME:0<br>1 - STORE HOURS<br>2 - HOLIDAYS<br>3 - DELAYS<br>0 - HELP | Press <3> at the Main Menu<br>to go to the Set Schedule Menu.<br>The menu also displays the time,<br>date, outside light level, period<br>of the day and the number of<br>additional minutes which have<br>been added to the current period.<br>Press <1> to Edit Store Hours. |
| Edit Store Hours: | |
| DAY:    OPEN:        CLOSE:<br>SUN     12:00 NOON   9:55 PM<br>↑                      0-HELP<br>PRESS ←→ TO CHANGE<br>FIELD, ↑↓ CHANGE DAY<br>DAY:    OPEN:        CLOSE:<br>MON     5:30 AM      11:00 PM<br>        ↑            0-HELP<br>PRESS ↑↓ TO CHANGE | Access is password restricted.<br>Press the <↑> up or <↓> down<br>keys to change the day. The<br>scheduled open and close times<br>are displayed for each day:<br>Sunday - Saturday and Holiday.<br>Press <←→ right or <←→ left<br>keys to move to the Open fields<br>and Close fields. Press the <↑> |
| FIELD, ↑↓ CHANGE DAY<br>YOU HAVE MADE SCHEDULE<br>CHANGES. DO YOU WANT TO<br>MAKE THESE CHANGES<br>PERMANENT?<br>PRESS <ENTER > FOR YES,<br>PRESS <CLEAR > FOR NO.<br>0-HELP | up or <↓> key to change<br>the value of the current field.<br>The current field is indicated by<br>the ↑ pointer and is named on<br>the bottom line. Press <ENTER><br>to save the changes or<br><CLEAR>to return to the Set<br>Schedule Menu. You will be<br>prompted to save the changes.<br>If you press <ENTER>,<br>all changes will be saved<br>in battery backed ram<br>(file B:USER.CFG). A note is<br>recorded in the transaction log.<br>If you press <CLEAR>, the<br>changes are not permanent and<br>the controller will revert to the<br>previous schedule after a<br>power outage. |
| Edit Holidays: | |
| 1-JAN01 2-DEC25 3- - -00 4- - -00<br>5- - -00<br>↑<br>PRESS ←→ CHANGE FIELD,<br>↑↓ CHANGE MONTH<br>PRESS <ENTER > TO ACCEPT<br>0 - HELP<br>1-JAN01 2-DEC25 3- - -00 4- - -00<br>5- - -00<br>       ↑<br>PRESS ←→ CHANGE FIELD,<br>↑↓ CHANGE DAY<br>PRESS <ENTER > TO ACCEPT<br>0 - HELP | Press <2> at the Set Schedule<br>Menu to edit holidays. Access is<br>password restricted. Press <←→><br>right or <←→> left keys to<br>change fields. Press <↑> up or<br><↓> down keys to change<br>the value of the selected field.<br>Up to five holidays may be<br>defined at any time. A blank - - -<br>month field indicates that no<br>holiday is defined. When the<br>current day matches one of the<br>dates on this schedule, the store<br>hours schedule for the Holiday<br>day of week is used. Press<br><ENTER> to accept the changes<br>and return to the Set Schedule<br>Menu. You will be prompted to<br>save changes as with the store<br>hours above. |
| Edit Delays: | |
| SETUP-015   CLOSE       CLEAN<br>            DELAY-005   UP-025<br>↑<br>HOW MANY MINUTES FROM<br>FIRST EMPLOYEE ARRIVAL<br>UNTIL STORE OPENS?<br>0 - HELP<br>SETUP-015   CLOSE       CLEAN<br>            DELAY-005   UP-025<br>            ↑<br>HOW MANY MINUTES WAIT<br>FOR CUSTOMERS TO LEAVE<br>AFTER STORE CLOSES?<br>0 - HELP<br>SETUP-015   CLOSE       CLEAN<br>            DELAY-005   UP-025<br>                        ↑<br>HOW MANY MINUTES ALLOWED<br>FOR EMPLOYEES TO CLEAN<br>UP AFTER LAST CUSTOMERS?<br>0 - HELP | Press <3> at the Set Schedule<br>Menu to edit delays. Access<br>is password restricted. Press<br><←→> right or <←→> left keys<br>to change fields. Press <↑><br>up or <↓> down keys to<br>change the value of the selected<br>field.<br>Press <ENTER> when all three<br>time delays are set as required to<br>save the changes and return to<br>the Set Schedule Menu. Press<br><ENTER>again to return to the<br>Main Menu. You will be<br>prompted to save changes as<br>with the store hours above |
| HVAC Menu: | |
| ZONE-1: 73.2<br>SET: AUTO STATUS: FAN<br>ZONE-2: 73.5<br>SET: AUTO STATUS: COOL<br>1-SETPOINT/ON/OFF<br>2-ADVANCED ADJ<br>0-HELP | Press <4> at the Main Menu to<br>go to the HVAC Menu. The<br>temperature of each zone<br>is displayed as well as the<br>status of both units. Press<br><1> to change the<br>setpoints or start or stop<br>the units. |
| Edit Setpoint: | |
| ZONE-1    SET:     FAN: | Access is password restricted. |

-continued

Local User Interface

| | |
|---|---|
| 73.2　　AUTO　AUTO<br>↑<br>PRESS ←→ CHANGE FIELD<br><ENTER> TO ACCEPT<br>PRESS ↑↓ CHANGE ZONE<br>0-HELP<br>ZONE-1　SET:　FAN:<br>73.2　　AUTO　AUTO<br>　　　　　↑<br>PRESS ←→ CHANGE FIELD<br><ENTER> TO ACCEPT<br>PRESS ↑↓ CHANGE ZONE<br>0-HELP<br>ZONE-1　SET:　FAN:<br>73.2　　AUTO　AUTO<br>　　　　　　　　↑<br>PRESS ←→ CHANGE FIELD<br><ENTER> TO ACCEPT<br>PRESS ↑↓ CHANGE ZONE<br>0-HELP | When the ↑ selector is under the zone number, you may change zones by pressing the <↑> up key or the <↓> down key. Press the <→> right key to edit the setpoint by degrees or tenths of a degree. As with all edit screens <←> left and <→> right keys change fields and <↑> up and <↓> down keys change values.<br>Each Heating/Air conditioning unit can be set to OFF, HEAT, COOL, or AUTO. The AUTO position allows the unit to switch between heating and cooling as required. The fan can be set to either ON or AUTO. The fan runs at all times in the ON position and only as required by the unit in the AUTO position.<br>Press <ENTER> to save the changes and return to the HVAC Menu. Press <CLEAR> to return to the Main Menu. You will be prompted to save changes as with the store hours above. |
| Password Prompt: | |
| A PASSWORD WITH PROPER AUTHORIZATION IS REQUIRED TO ACCESS THIS FUNCTION.<br>PRESS <ENTER> TO ENTER PASSWORD.<br>PRESS <CLEAR> TO RETURN TO MENU.<br>ENTER USER NUMBER:_<br>(BETWEEN 1–20)<br>USER NUMBER:2 ALLEN<br>ENTER PASSWORD:**_ | Anytime access of a password restricted function is attempted, authorization is verified. If the current password does not have authorization for the requested function, the user is prompted for another password. Press <ENTER> to be prompted for your user number and password.<br>You may also reach the password screen by pressing <5> at the Main Menu. Enter you assigned user number between 1 and 20. Either enter 2 digits or one digit followed by <ENTER>. Your name or initials will be displayed and you will be prompted for your password. Enter your password one character at a time. Wait for the * asterik to be displayed after each key before pressing the next one. If you password is less than 6 characters, press <ENTER>.<br>Upon entry of a valid password with authorization, the function resumes where it left off. |
| Edit Password Prompt: | |
| 04:01PM MON NOV 07, 1994<br>2 ALLEN ACCESS APPROVED<br>1 - CONTINUE<br>2 - EDIT PASSWORDS<br>0 - HELP | The Edit Password Prompt is displayed only after a user who is authorized to edit passwords selects 5-PASSWORD from the Main Menu and enters a valid password. Press <1> to return to the Main Menu or <2> to advance to the Select User Menu. |
| Select User Menu: | |
| USER:　NAME:　PASSWORD:**<br>04　　JIM<br>↑ | Press <↑> up or <↓> down to select a user. Press <2> to edit the name and password for |

-continued

Local User Interface

| | |
|---|---|
| ↑↓ CHANGE USER<br><CLEAR> GO BACK<br>1-EDIT PASSWORD<br>2-EDIT ACCESS<br>0-HELP<br>Edit Name and Password: | that user. |
| USER:　NAME:　PASSWORD:**<br>04　　JIM<br>　　　　　　　　↑<br>↑↓ EDIT CHARACTER<br>←→ NEXT CHARACTER/<br>CHANGE FIELD 0-HELP | Each character of the name can be edited by scrolling through the alphabet with the <↑> up and <↓> down keys. Move to another character with the <←> left and <→> right keys. The password becomes visible when the <↑> selector is under a character in the password field. Press <ENTER> to save the changes and return to the Selct User Menu. |
| Select User Menu: | |
| USER:　NAME:　PASSWORD:**<br>04　　JIM<br>↑<br>↑↓ CHANGE USER<br><CLEAR> GO BACK<br>1 - EDIT PASSWORD<br>2 - EDIT ACCESS<br>0 - HELP<br>Edit Access | Press <↑> up or <↓> down to select a user. Press <2> to edit the authorized access for that user. |

There are five topics in the Edit Access menus. Each topic corresponds with a selection on the Main Menu. The <↑> up and <↓> down keys change topics when the ↑ selector is under the topic field. Each topic has a number of fields corresponding with available sub-menu selections. The topics and fields are:

Edit Access - Circuits:

| | |
|---|---|
| USER:01 JIM　　0-HELP<br>CRKT: 1-SCH:Y 2-LVL:Y 3-OVD:Y 4-EDT:Y<br>↑　　　↑↓ CHG TOPICS ←→CHG FIELDS<br>ALLOW ACCESS TO CIRCUITS<br><ENTER> ACCEPT | CRKT: Circuits<br>1-SCH: Edit circuit<br>　　schedule<br>2-LVL: Edit light level<br>3-OVD: Override the<br>　　time Schedule |

Edit Access - Time:

| | |
|---|---|
| USER:01 JIM　　0-HELP<br>TIME: 1-SET:Y<br>↑　　　↑↓ CHG TOPICS ←→ CHG FIELDS<br>ALLOW ACCESS TO TIME <ENTER><br>ACCEPT | TIME: Time<br>1-SET: Set time and<br>　　date |

Edit Access - Schedules

| | |
|---|---|
| USER:01 JIM　　0-HELP<br>SCHD: 1-HRS:Y 2-HDY:Y 3-DLY:Y<br>↑　　　↑↓ CHG TOPICS ←→ CHG FIELDS<br>ALLOW ACCESS TO SCHEDULES <ENTER><br>ACCEPT | SCHD: Schedules<br>1-HRS: Edit store<br>　　hours<br>2-HDY: Edit holidays<br>3-DLY:Edit delays:<br>　　set-up, close,<br>　　clean-up |

Edit Access - Heating/Cooling

| | |
|---|---|
| USER:01 JIM　　0-HELP<br>HTCL: 1-SET:Y 2-ADV:Y<br>↑　　　↑↓ CHG TOPICS ←→ CHG FIELDS<br>ALLOW ACCESS TO HEAT/COOL <ENTER><br>ACCEPT | HTCL: Heating/<br>　　Cooling<br>1-SET: Edit setpoints<br>　　and turn units<br>　　on and off |

Edit Access - Passwords

| | |
|---|---|
| USER:01 JIM　　0-HELP<br>PSWD: 1-EDT:Y | PSWD: Passwords<br>1-EDT: Edit |

-continued

Local User Interface

| | | | |
|---|---|---|---|
| ↑ ↑↓ CHG TOPICS ←→ CHG FIELDS | | passwords | |
| ALLOW ACCESS TO PASSWORD <ENTER> | | and access | |
| ACCEPT | | authority | |
| Example: Edit access to holiday schedule | | | |
| USER:01 JIM 0-HELP | Since all access authorization | | |
| SCHD: 1-HRS:Y 2-HDY:Y 3-DLY:Y | is done the same way, only one | | |
| ↑ 1-YES | example is needed. To authorize | | |
| ALLOW ACCESS TO SCHEDULE | access to edit the Holiday | | |
| HOLIDAYS 2-NO | Schedule, select the Schedules | | |
| | topic by pressing the <↑> up | | |
| | key twice. Select the Holiday | | |
| | field by pressing the <→> right | | |
| | key twice. Press <1> to allow | | |
| | access to edit the holidays or | | |
| | <2> to deny access. | | |
| | After all access | | |
| | authorizations have been set | | |
| | as needed, save the settings | | |
| | by pressing <ENTER> and | | |
| | return to the Select User Menu. | | |
| | Press <CLEAR> to return | | |
| | to the Main Menu. | | |
| YOU HAVE MADE PASSOWRD | You will be prompted to save | | |
| CHANGES. DO YOU WANT | the changes. If you press | | |
| TO MAKE THESE CHANGES | <ENTER>, all changes | | |
| PERMANENT? | will be saved in battery | | |
| PRESS <ENTER> FOR YES, | backed ram (file | | |
| PRESS <CLEAR > FOR NO. | B:USER.PWD). A note is | | |
| 0-HELP | recorded in the transaction | | |
| | log. If you press <CLEAR>, | | |
| | the changes are not permanent | | |
| | and the controller will revert | | |
| | to the previous passwords and | | |
| | access authorizations after a | | |
| | power outage. | | |
| Set Up Menu: | | | |
| SETUP & INPUT OUTPUT | Press <6> at the Main Menu | | |
| DIAGNOSTICS 0-HELP | to reach the Set Up Menu. Item | | |
| 1 - ANALOG IN | 6 is not displayed because this | | |
| 2 - DIGITAL IN | menu is only used for the intial | | |
| 3 - DIGITAL OUT | startup of the system and for | | |
| | diagnostics. The Set Up Menu | | |
| | is not needed for normal | | |
| | operation. Access is password | | |
| | restricted. | | |

Remote Control

The controller can be operated remotely by an RS-232 serial port. Upper case ASCII characters are processed just if they came from the keypad on the front panel. All number keys are the same. The arrows are represented by the first initial: U for <↑> up, D for <↓> down, L for <←> left, and R for <→> right <ENTER> is represented by E and <CLEAR> is represented by C. All other upper case characters are ignored.

The controller also recognizes specific commands which are entered in lower case;

window displays a copy of the LCD on the remote terminal. ANSI cursor positioning commands are used place the text. Therefore the terminal is must be capable of ANSI emulation.

help displays a list of commands available for remote use.

tty blanks the screen and stops the copy of the LCD from being displayed.

dir lists the directory of drive B:

type lists a text file. It can be used to list the user files such as the user configuration, USER.CPFG or log files such as AUG.LOG.

These commands with upper case emulating the keypad and lower case providing additional features not available from the local keypad, provide a simple means of remote control using a PC and generic modem software. It also provides the means to interface with a specific Microsoft Windows based product.

Certain modifications and improvements will occur to those skilled in the art upon a reading of the foregoing description. By way of example, "smart" relays or breakers may be used in place of motorized breakers. Also, a touch screen could be used in place of the LCD display and keypad. In addition, a network interface could be used in place of or in addition to a modem. It should be understood that all such modifications and improvements have been deleted herein for the sake of conciseness and readability but are properly within the scope of the following claims.

We claim:

1. An electrical distribution computer for delivering and controlling power to a plurality of electrical circuits in a business facility comprising:

(a) a unitary enclosure, wherein said enclosure includes a back, top, bottom, sides and a door;

(b) a single processor means having a central processing unit, a clock for providing a clock signal to said central processing unit, memory for storing an application program for said central processing unit, said application program controlling at least lights, heating and air-conditioning of the business facility relative to the business operating hours instead of the time of day set through a series of menus for setting or editing schedules including delays for the conditions of closed, set up, store open, last customer, and clean up delays, thereby facilitating changes in the hours of operation whereby if the business hours are changed, each of said circuits is automatically changed with respect to the new business operating hours and an interface having a plurality of outputs and a plurality of inputs communicably associated with said processor means;

(c) a plurality of computer controllable circuit breakers having a circuit breaker input for receiving a circuit breaker control signal from said interface; and (d) a single display directly connected to said single processor means for displaying information provided by said processor means includes said series of menus, said display having a display input for receiving a display signal from said interface, and a keypad having an output for providing information to said interface, wherein said display unit and said keypad are located on an outer wall of said enclosure to permit said processor means to be operated without opening said door.

2. The apparatus according to claim 1 further including a plurality of environmental sensors having an output for providing sensor signals proportional to environmental factors and an analog-to-digital converter for converting said sensor signals from said sensors into digital signals, said analog-to-digital converter including means to transmit said digital signals to said interface.

3. The apparatus according to claim 2 wherein said environmental sensors detect temperature and light.

4. The apparatus according to claim 1 further comprising a plurality of relays having inputs for receiving a relay control signal from said interface, said relays configured to switch power on or off to said electrical circuits.

5. The apparatus according to claim 1 wherein said electrical circuit includes one said circuit breaker and one said relay.

6. The apparatus according to claim 1 wherein one said interface output controls the heating and air conditioning unit.

7. The apparatus according to claim 1 wherein one said interface output controls lighting circuits.

8. The apparatus according to claim 1 wherein one said interface output controls at least one pump motor.

9. The apparatus according to claim 1 further including a remote bypass for delaying an event stored in the application program from being executed, said bypass providing a signal to said interface.

10. The apparatus according to claim 1 further including a pedestal connected to said enclosure for supporting said enclosure and providing wiring space.

11. The apparatus according to claim 1 further comprising a main power input for receiving power from a power distribution line.

12. The apparatus according to claim 11 further comprising a main surge suppressor for suppressing power surges from said power distribution line.

13. The apparatus according to claim 1 further comprising a plurality of circuit surge suppressors for suppressing surges in said electrical circuits.

14. The apparatus according to claim 4 wherein said relay controls electrical power to an emergency cutoff switch.

15. An electrical distribution computer for delivering and controlling power to a plurality of electrical circuits in a business facility comprising:
   (a) a unitary enclosure, wherein said enclosure includes a back, top, bottom, sides and a door;
   (b) a single processor means having a central processing unit, a clock for providing a clock signal to said central processing unit, memory for storing an application program for said central processing unit, said application program controlling at least lights, heating and air-conditioning of the business facility relative to the business operating hours instead of the time of day set through a series of menus for setting or editing schedules including delays for the conditions of closed, set up, store open, last customer, and clean up delays, thereby facilitating changes in the hours of operation whereby if the business hours are changed, each of said circuits is automatically changed with respect to the new business operating hours, a remote communication means for providing communications to said electrical distribution computer from a remote device and an interface having a plurality of outputs and a plurality of inputs communicably associated with said processor means;
   (c) a plurality of computer controllable circuit breakers having a circuit breaker input for receiving a circuit breaker control signal from said interface; and
   (d) a single display directly connected to said single processor means for displaying information provided by said processor means including said series of menus, said display having a display input for receiving a display signal from said interface, and a keypad having an output for providing information to said interface, wherein said display unit and said keypad are located on an outer wall of said enclosure to permit said processor means to be operated without opening said door.

16. The apparatus according to claim 15 further including a plurality of environmental sensors having an output for providing sensor signals proportional to environmental factors and an analog-to-digital converter for converting said sensor signals from said sensors into digital signals, said analog-to-digital converter including means to transmit said digital signals to said interface.

17. The apparatus according to claim 16 wherein said environmental sensors detect temperature and light.

18. The apparatus according to claim 15 further comprising a plurality of relays having inputs for receiving a relay control signal from said interface, said relays configured to switch power on or off to said electrical circuits.

19. The apparatus according to claim 15 wherein said electrical circuit includes one said circuit breaker and one said relay.

20. The apparatus according to claim 15 wherein one said interface output controls the heating and air conditioning unit.

21. The apparatus according to claim 15 wherein one said interface output controls lighting circuits.

22. The apparatus according to claim 15 wherein one said interface output controls at least one pump motor.

23. The apparatus according to claim 15 further including a remote bypass for delaying an event stored in the application program from being executed, said bypass providing a signal to said interface.

24. The apparatus according to claim 15 further including a pedestal connected to said enclosure for supporting said enclosure and providing wiring space.

25. The apparatus according to claim 15 further comprising a main power input for receiving power from a power distribution line.

26. The apparatus according to claim 25 further comprising a main surge suppressor for suppressing power surges from said power distribution line.

27. The apparatus according to claim 15 further comprising a plurality of circuit surge suppressors for suppressing surges in said electrical circuits.

28. The apparatus according to claim 18 wherein said relay controls electrical power to an emergency cutoff switch.

29. The apparatus according to claim 15 wherein said remote communication means uses an RS232 transceiver.

30. The apparatus according to claim 15 wherein said remote communication means uses an RS422 transceiver.

31. The apparatus according to claim 15 wherein said remote communication means uses a modem.

32. The apparatus according to claim 15 wherein said memory includes read-only-memory.

33. The apparatus according to claim 15 wherein said memory includes random-access-memory.

34. The apparatus according to claim 15 further comprising a security sensor for providing a security signal to said interface, wherein said processing means is programmed to handle an emergency situation when said security sensor is activated.

* * * * *